(12) United States Patent
Rittweger

(10) Patent No.: US 12,005,745 B2
(45) Date of Patent: Jun. 11, 2024

(54) PNEUMATIC VEHICLE TIRE

(71) Applicant: Continental Reifen Deutschland GmbH, Hannover (DE)

(72) Inventor: Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 238 days.

(21) Appl. No.: 16/982,067

(22) PCT Filed: Jan. 14, 2019

(86) PCT No.: PCT/EP2019/050747
§ 371 (c)(1),
(2) Date: Sep. 18, 2020

(87) PCT Pub. No.: WO2019/179666
PCT Pub. Date: Sep. 26, 2019

(65) Prior Publication Data
US 2021/0016608 A1    Jan. 21, 2021

(30) Foreign Application Priority Data
Mar. 20, 2018    (DE) ...................... 10 2018 204 245.4

(51) Int. Cl.
*B60C 13/00*        (2006.01)
(52) U.S. Cl.
CPC ................................. *B60C 13/001* (2013.01)
(58) Field of Classification Search
CPC ........ B60C 13/00; B60C 13/001; B60C 13/02
See application file for complete search history.

(56) References Cited

U.S. PATENT DOCUMENTS

| | | | |
|---|---|---|---|
| 2008/0283169 A1 | 11/2008 | Sato et al. | |
| 2009/0218019 A1* | 9/2009 | Paturle | B29C 33/424 |
| | | | 428/88 |
| 2014/0021662 A1 | 1/2014 | Izumi et al. | |
| 2014/0216622 A1* | 8/2014 | Muhlhoff | B60C 13/02 |
| | | | 152/523 |
| 2015/0314653 A1 | 11/2015 | Iwabuchi | |
| 2021/0094359 A1* | 4/2021 | Shinzawa | B60C 13/001 |

FOREIGN PATENT DOCUMENTS

| | | |
|---|---|---|
| DE | 102008010486 A1 | 9/2008 |
| EP | 2502758 A1 | 9/2012 |
| EP | 2720887 A1 | 4/2014 |

(Continued)

OTHER PUBLICATIONS

English machine translation of JP2000-280716. (Year: 2000).*

(Continued)

*Primary Examiner* — Robert C Dye

(57) ABSTRACT

Pneumatic vehicle tire having sidewalls and having at least one hatching area (1) or a hatched area element on at least one sidewall, wherein the hatching area (1) or the area element has a multiplicity of hatching ribs (2, 2', 2") running next to one another and having two lateral flanks (3a, 3'a, 3"a, 3b, 3'b, 3"b). The one lateral flank (3a, 3'a, 3"a) of the hatching ribs (2, 2', 2") has a surface finish which differs from that on the other lateral flank (3b, 3'b, 3"b) of the hatching ribs (2, 2', 2").

14 Claims, 3 Drawing Sheets

(56) References Cited

FOREIGN PATENT DOCUMENTS

Figure 1:
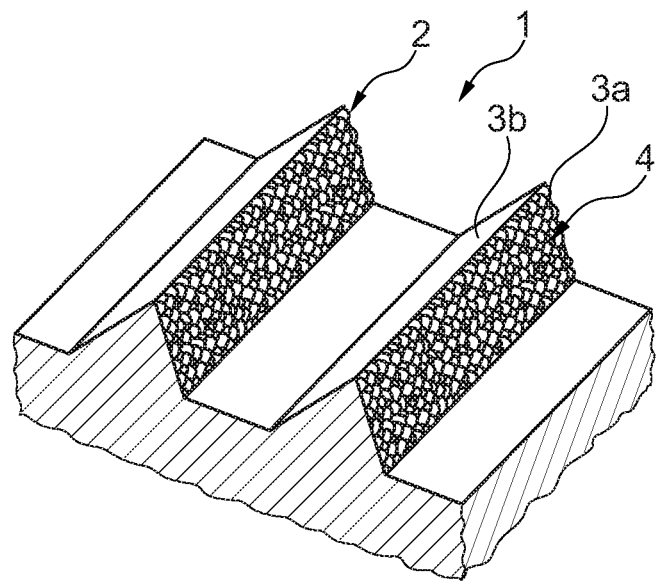

| | | | | |
|---|---|---|---|---|
| JP | 2000-280716 | * | 10/2000 | |
| JP | 2003-175707 | * | 6/2003 | |
| JP | 2009143488 A | * | 7/2009 | ........... B60C 13/001 |
| JP | 2009143488 A | | 7/2009 | |
| JP | 2011255803 A | | 12/2011 | |
| JP | 2012001031 A | | 1/2012 | |
| JP | 2014061820 A | | 4/2014 | |

OTHER PUBLICATIONS

English machine translation of JP2003-175707. (Year: 2003).*
English machine translation of JP-2009143488-A. (Year: 2009).*
International Search Report of application PCT/EP2019/050747 which this application is based on.

* cited by examiner

PNEUMATIC VEHICLE TIRE

The invention relates to a pneumatic vehicle tire having sidewalls and having at least one hatching area or a hatched area element on at least one sidewall, wherein the hatching area or the area element has a multiplicity of hatching ribs running next to one another and having two lateral flanks.

Hatching areas formed on sidewalls of pneumatic vehicle tires primarily serve the purpose of creating a contrast with existing smooth surface areas of the sidewalls, in order in this way for example to improve the legibility of inscriptions located on the sidewalls. In addition, unevennesses in the sidewalls of a tire caused by the construction process can be concealed by hatching areas. It is often also desired for hatching area elements to have a three-dimensional effect, since truly three-dimensional design elements on sidewalls are not possible for reasons of uniformity of the tire.

A pneumatic vehicle tire of the type mentioned at the beginning is known for example from US 2014/021662 A1. The hatching area comprises cross-sectionally triangular hatching ribs, the two lateral flanks of which are additionally structured with elongate conical or columnar projections. The number of these projections is at least five per square millimeter, their average cross-sectional area is 0.003 $cm^2$ to 0.06 $cm^2$. The columnar projections are aligned parallel to one another and have in each case an average width of 0.03 mm to 0.10 mm and a height of at least 0.1 mm. Further embodiments of hatching areas on sidewalls with hatching ribs running next to one another are known for example from EP 2 502 758 A1 and DE 10 2008 010 486 A1.

The invention is therefore based on the object of further improving hatching areas comprising hatching ribs, in particular in order to achieve a particularly striking contrast effect and optical effects caused by light reflection and shadow formation, which are not possible with the hatchings known to date.

The stated object is achieved according to the invention in that the one lateral flank of the hatching ribs has a surface finish which differs from that on the other lateral flank of the hatching ribs.

Since the surface finish of the lateral flanks of the hatching ribs is directly related to the light absorption or light reflection effect of the lateral flanks, hatching ribs formed according to the invention have differently light-reflecting lateral flanks. This creates a particularly striking and optically advantageous contrast effect depending on the incidence of light and light intensity. In addition, the different surface finish of the flanks of the ribs creates shadow effects, which, particularly on the black rubber of the sidewalls, make the hatching clearly stand out from the surrounding surface areas.

The contrast effect of the hatching ribs with respect to the other surface areas of the sidewall that can be achieved by light absorption and light reflection is particularly clear in an embodiment in which, when hatching ribs running next to one another are viewed, the flank with the one surface finish on the one hatching rib is facing the flank with the other surface finish on the adjacent hatching rib.

With preferred embodiments, a particularly effective, different surface finish of the two lateral flanks of the hatching ribs can be realized. In an embodiment that is particularly preferred in this respect, the surface finish is a three-dimensional structure at least on one of the lateral flanks of the hatching ribs; alternatively, both lateral flanks of the hatching ribs may also have different three-dimensional structures as a surface finish.

There are also various possibilities with respect to the configuration of the three-dimensional structures, which can be used depending on the desired contrast effect. In a preferred configuration, the three-dimensional structure consists of a multiplicity of elevations and depressions, which are preferably formed directly next to one another, on the respective flank or flanks of the hatching ribs, the elevations and depressions having a height or depth of in particular 0.5 mm to 0.8 mm. Three-dimensional structures may preferably completely cover the lateral flanks.

A particularly good contrast effect, which may be particularly clear depending on the incidence of light, can be achieved in the case of a configuration of the three-dimensional structure in which it consists of a multiplicity of additional ribs which run parallel to one another and at right angles to the extent of the hatching ribs and which have in particular a width at their base of 0.1 mm to 0.5 mm. There are therefore hatching ribs with ribs additionally provided on at least one lateral flank. These additional ribs can all be embodied in the same or at least a similar form and, viewed in cross section, be in particular configured in a triangular, trapezoidal or round manner and be arranged at mutual distances from one another or directly adjoin one another.

The contrast effect is particularly clear in the case of hatching ribs in the case of which the one lateral flank of each is a smooth surface free of structures.

Preferred configurations of the hatching ribs include those in the case of which the hatching ribs, viewed in cross section, are embodied in a triangular, in particular isosceles triangular, or trapezoidal, in particular isosceles trapezoidal form.

When viewed in cross section, the flanks of the hatching ribs preferably run at an angle of 5° to 60°, in particular of at most 30°, in relation to the sidewall.

Particularly striking contrasts can also be achieved with a further preferred embodiment in which the lateral flanks of the hatching ribs run at different angles in relation to the sidewall, the larger angle being in particular 5° to 30° larger than the smaller one.

A different intensity of light reflection is also achieved in a further special configuration of hatching areas provided with hatching ribs which, at least in sections, run over local, in particular dome-like projections, which in particular have a height of 0.1 mm to 0.3 mm.

Further features, advantages and details of the invention will now be described in more detail on the basis of the drawing, which schematically shows exemplary embodiments of the invention. In the drawing, FIG. 1 shows a view of hatching ribs of a hatching area of a sidewall of a pneumatic vehicle tire with a first variant of the invention, FIG. 1*a* shows a cross section through the hatching ribs of FIG. 1, FIG. 2 shows a view of hatching ribs of a hatching area of a sidewall of a pneumatic vehicle tire with a second variant of the invention, FIG. 3 shows a view of hatching ribs of a hatching area of a sidewall of a pneumatic vehicle tire with a third variant of the invention and FIG. 4 and FIG. 5 each show further embodiments of hatching ribs in cross section.

On the sidewall of pneumatic vehicle tires, the prescribed information, such as dimensions, the speed index, the manufacturer, the intended use (summer/winter tire) and the like, is usually given. This information is located on smooth surface areas and is formed from raised elements in the rubber material of the sidewall. However, there remains quite a lot of free space on the sidewalls of pneumatic vehicle tires for hatchings, which are formed from a multiplicity of elevations and depressions and on the one hand provide a clear contrast with the smooth surface areas in the sidewall on which the inscriptions mentioned are provided, and on the other hand conceal possible construction-related unevennesses on the sidewalls. The hatchings are created in the course of the vulcanization by depressions formed in the mold parts or mold segments of the vulcanizing mold. Depending on the type of hatching, these depressions are produced, in particular in a known manner, by milling processes and/or by means of laser engraving.

Figure 1A:
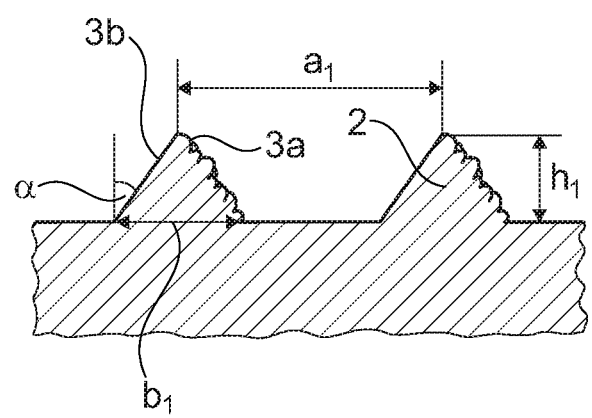
Figure 2:
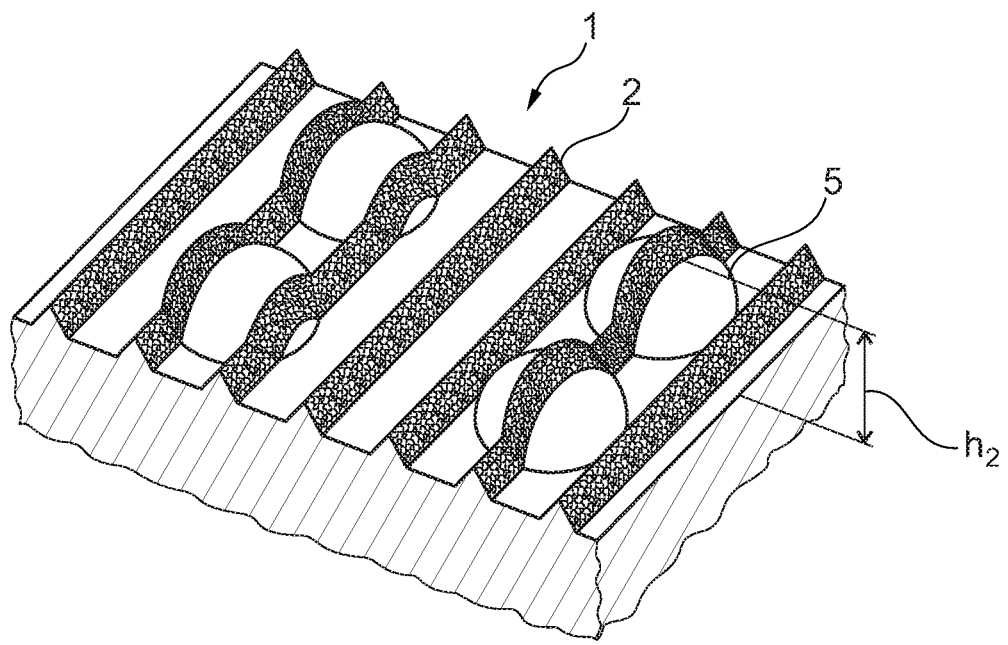
Figure 3:
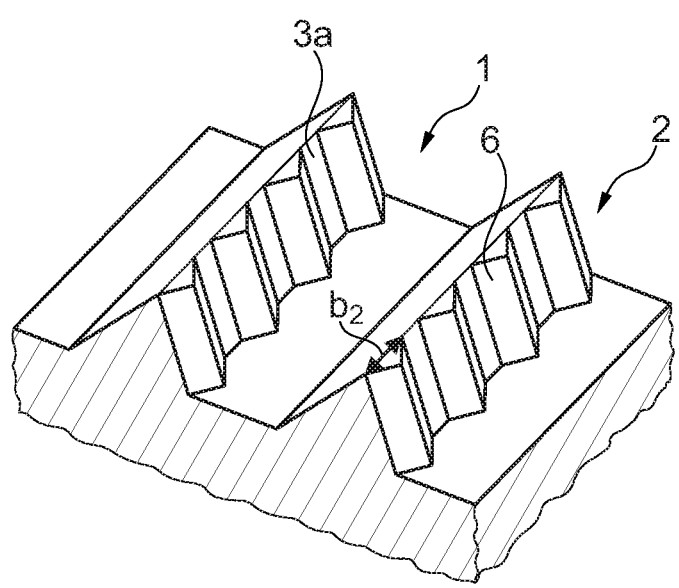

FIG. 1 to FIG. 3 each show a detail of a hatching area 1 or an area element with hatching ribs 2 running straight and parallel to one another, which form a basic hatching in the hatching area 1. The hatching ribs 2 may alternatively also run in a wave-shaped, arc-shaped or similar manner and are either elevations projecting beyond the level of the sidewall surrounding the hatching area or elevations extending in a depression formed in the sidewall and preferably not projecting beyond the level otherwise of the sidewall.

In the exemplary embodiments shown in FIGS. 1 to 3, the hatching ribs 2, viewed in cross section, are isosceles triangular and have a structured lateral flank 3a forming one leg of the triangle and a smooth or unstructured lateral flank 3b forming the other leg of the triangle. One lateral flank 3a of the hatching ribs 2 therefore has a surface finish which differs from that of the other lateral flank 3b of the hatching ribs 2. According to FIG. 1a, the hatching ribs 2 have a width $b_1$ of 0.1 mm to 0.7 mm at their base, also a maximum height $h_1$ of 0.1 mm to 0.8 mm and a mutual distance $a_1$ from one another, determined at the locations of maximum height $h_1$, of 0.2 mm to 1.5 mm.

The lateral flanks 3a, 3b run in relation to the level of the hatching area 1 or the sidewall at the same angles α of 5° to 60°, preferably up to 45°, in particular of at most 30°. The hatching ribs 2 are embodied in such a way that the structured lateral flank 3a of a hatching rib 2 faces the smooth lateral flank 3b of the respectively adjacent hatching rib 2.

In the embodiment according to FIG. 1, the structured lateral flank 3a is provided, preferably covered, with a non-uniform structure 4, which gives the lateral flank 3a a roughness, i.e. an unevenness. The structure 4 is made up for example of a multiplicity of elevations and depressions, in particular formed directly next to one another, the height or depth of which varies in a range from 0.05 mm to 0.8 mm.

The variant shown in FIG. 2 differs from that according to FIGS. 1 and 1a in that some hatching ribs 2 extend over locally-formed, in the exemplary embodiment shown dome-like, in particular hemispherical, projections 5, which are spaced apart from one another in the direction of extent of the hatching ribs 2 and which have for example a height $h_2$ of 0.1 mm to 0.3 mm, in particular of 0.2 mm. As shown in FIG. 2, with corresponding dimensioning of the projections 5, adjacent hatching ribs 2 can extend over the same projections 5. The projections 5 are at mutual distances of a few millimeters, for example 3.0 mm to 10.0 mm, in the direction of extent of the hatching ribs 5.

FIG. 3 shows an embodiment which differs from the embodiment according to FIG. 1 in that a multiplicity of additional ribs 6 have been provided on the structured lateral flank 3a of the hatching ribs 2. The additional ribs 6 run straight, furthermore in a plan view of the hatching area 1 perpendicular to the direction of extent of the hatching ribs 2 and in particular over the entire extent of the lateral flank 3a. Furthermore, in the exemplary embodiment shown, the additional ribs 6, viewed in cross section, are formed in an isosceles triangular manner and run at mutual distances from one another. However, the additional ribs 6 may also be formed directly next to one another and have a different cross-sectional form, for example round or semicircular. At their base lying on the lateral flank 3a, the additional ribs 6 have a width $b_2$ of 0.1 mm to 0.5 mm.

Figure 4:
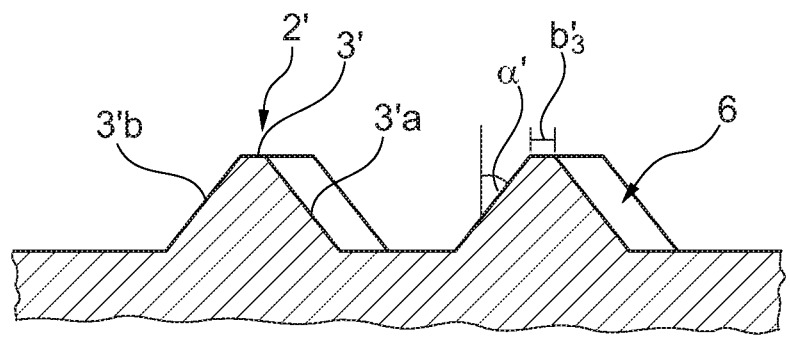
Figure 5:
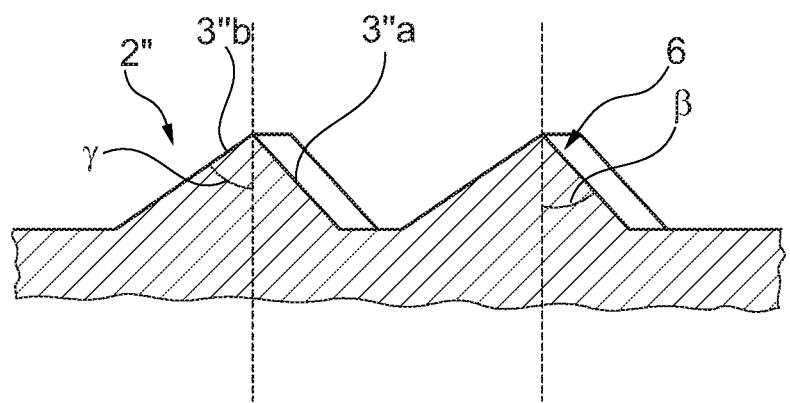

FIGS. 4 and 5 will be used below as a basis for describing hatching ribs 2', 2'', which are variants of the hatching rib 2, additional ribs 6 being provided by way of example in the exemplary embodiments shown. The height and width of the hatching ribs 2', 2'' may correspond to the already mentioned height and width of the hatching ribs 2.

FIG. 4 shows two hatching ribs 2' which run next to one another, are of an isosceles trapezoidal form in cross section and which, in accordance with their trapezoidal form, have a plateau area 3' with a width $b_3$ of 0.05 mm to 0.5 mm. Lateral flanks 3'a, 3'b, which form trapezoidal legs, adjoin the plateau area 3' and run at an angle α' of 5° to 60°, preferably up to 45°, in particular of at most 30°, to the sidewall (not shown).

In the variant shown in FIG. 5, the hatching ribs 2'' are provided with an asymmetrically triangular cross section, which in the example are each delimited by a structured lateral flank 3''a and a smooth lateral flank 3''b. The structured lateral flank 3''a runs at an angle β to the sidewall and the smooth lateral flank 3''b runs at an angle γ, deviating from the angle β, to the sidewall. The angle β is 5° to 60°, the angle γ is in particular at least 5° larger than the angle β. The angle γ is preferably 10° to 30° larger than the angle β.

The invention is not limited to the embodiments described. The structured lateral flank can be structured in any way, for example with lattice-like projections. In particular, both flanks of the hatching ribs may be structured, the structure on one flank differing from that on the other flank. The variants shown or described can be combined with one another, the cross-sectional shape of the hatching ribs also being independent of the structures formed on the lateral flanks. In addition, the areas between the hatching ribs may likewise be structured.

LIST OF REFERENCE SIGNS

1 . . . Hatching area
2, 2', 2'' . . . Hatching rib
3a, 3b . . . Lateral flank
3' . . . Plateau area
3'a, 3'b . . . Lateral flank
3''a, 3''b . . . Lateral flank
4 . . . Structure
5 . . . Projection
6 . . . Additional ribs
$a_1$ . . . Distance
$b_1, b_2, b_3$ . . . Width
$h_1, h_2$ . . . Height
α, β, γ . . . Angles

I claim:
1. A pneumatic vehicle tire, comprising:
sidewalls, and
at least one hatching area or a hatched area element on at least one of the sidewalls,
wherein the hatching area or the area element has a multiplicity of hatching ribs running next to one another,
wherein each of the multiplicity of hatching ribs has two lateral flanks, wherein, of the two lateral flanks, a first lateral flank has a first surface finish that differs from a second surface finish on a second lateral flank of the hatching ribs, wherein at least the first surface finish includes a three-dimensional structure, wherein the three-dimensional structure covers an entire lengthwise extent of each respective first lateral flank on which the three-dimensional structure is applied, wherein the three-dimensional structure includes a multiplicity of additional ribs that are parallel to one another and at right angles to the extent of the hatching ribs, wherein each of the multiplicity of additional ribs extends along; an entire height of the first lateral flank from a tip of the first lateral flank to a base of the first lateral flank.

2. The pneumatic vehicle tire as claimed in claim 1, wherein when the hatching ribs running next to one another are viewed, the first lateral flank of the hatching rib comprising the first surface finish is facing a further lateral flank of an adjacent hatching rib comprising the second surface finish.

3. The pneumatic vehicle tire as claimed in claim 1, wherein the additional ribs are formed by a multiplicity of elevations and depressions formed directly next to one another, the elevations having a height of 0.05 mm to 0.8 mm, and the depressions having a depth of 0.05 mm to 0.8 mm.

4. The pneumatic vehicle tire as claimed in claim 1, wherein the additional ribs have a width ($b_2$) at their base of 0.1 mm to 0.5 mm.

5. The pneumatic vehicle tire as claimed in claim 1, wherein the hatching ribs, viewed in cross section, are triangular.

6. The pneumatic vehicle tire as claimed in claim 5, wherein the first lateral flank of the hatching ribs runs at a first angle of 5° to 60° in relation to a line normal the sidewall and the second lateral flank runs at a second angle that is larger than the first angle by at least 5° in relation to a line normal the sidewall.

7. The pneumatic vehicle tire as claimed in claim 6, wherein the second angle is 30° larger than the first angle.

8. The pneumatic vehicle tire as claimed in claim 1, wherein the hatching ribs are provided with dome-like projections thereon having a height ($h_2$) of 0.1 mm to 0.3 mm.

9. The pneumatic vehicle tire as claimed in claim 1, wherein the additional ribs, viewed in cross section, are triangular.

10. The pneumatic vehicle tire as claimed in claim 9, wherein the additional ribs are evenly spaced apart from one another along the entire lengthwise extent of the first lateral flank.

11. The pneumatic vehicle tire as claimed in claim 1, wherein the additional ribs directly adjoin one another.

12. The pneumatic tire according to claim 1, wherein the additional ribs are evenly spaced apart from one another along the entire lengthwise extent of the first flank.

13. The pneumatic tire according to claim 12, wherein the additional ribs have a width at their base of 0.1 mm to 0.5 mm.

14. The pneumatic tire according to claim 13, wherein the additional ribs are triangular.

* * * * *